US007987383B1

(12) United States Patent
Coatney et al.

(10) Patent No.: US 7,987,383 B1
(45) Date of Patent: Jul. 26, 2011

(54) SYSTEM AND METHOD FOR RAPID INDENTIFICATION OF COREDUMP DISKS DURING SIMULTANEOUS TAKE OVER

(75) Inventors: Susan M. Coatney, Sunnyvale, CA (US); Loellyn J. Cassell, Sunnyvale, CA (US); Angel B. Aviles, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 616 days.

(21) Appl. No.: 11/741,546

(22) Filed: Apr. 27, 2007

(51) Int. Cl.
*G06F 11/00* (2006.01)

(52) U.S. Cl. .................... 714/4.11; 714/6.1; 709/226

(58) Field of Classification Search .................. 714/6, 7, 714/42, 4.11, 6.1, 11, 13
See application file for complete search history.

(56) References Cited

U.S. PATENT DOCUMENTS

| | | | |
|---|---|---|---|
| 5,163,131 A | 11/1992 | Row et al. | |
| 5,293,612 A | 3/1994 | Shingai | |
| 5,355,453 A | 10/1994 | Row et al. | |
| 5,485,579 A | 1/1996 | Hitz et al. | |
| 5,664,115 A | 9/1997 | Elko et al. | |
| 5,666,512 A | 9/1997 | Nelson et al. | |
| 5,802,366 A | 9/1998 | Row et al. | |
| 5,819,292 A | 10/1998 | Hitz et al. | |
| 5,931,918 A | 8/1999 | Row et al. | |
| 5,941,972 A | 8/1999 | Hoese et al. | |
| 5,963,962 A | 10/1999 | Hitz et al. | |
| 5,996,086 A | 11/1999 | Delaney et al. | |
| 5,999,933 A | 12/1999 | Mehta | |
| 6,038,570 A | 3/2000 | Hitz et al. | |
| 6,065,037 A | 5/2000 | Hitz et al. | |
| 6,249,879 B1 | 6/2001 | Walker et al. | |
| 6,425,035 B2 | 7/2002 | Hoese et al. | |
| 6,671,773 B2 | 12/2003 | Kazar et al. | |
| 6,751,136 B2 | 6/2004 | Hetrick et al. | |
| 6,775,702 B2 | 8/2004 | Oeda et al. | |
| 6,792,559 B1 | 9/2004 | Cohen et al. | |
| 6,836,832 B1 | 12/2004 | Klinkner | |
| 6,993,701 B2 | 1/2006 | Corbett et al. | |
| 7,028,154 B2 | 4/2006 | Reeves | |

(Continued)

OTHER PUBLICATIONS

Agbaria et al., "Design, Implementation, and Performance of Checkpointing in NetSolve," Dependable Systems and Networks, 2000. DSN 200. Proceedings International Conference on New York, NY, USA Jun. 25-28, 2000, Los Alamitos, CA, USA, IEEE Comput. Soc. US, Jun. 25, 2000. 6 pages.

(Continued)

*Primary Examiner* — Robert Beausoliel
*Assistant Examiner* — Elmira Mehrmanesh
(74) *Attorney, Agent, or Firm* — Cesari and McKenna, LLP

(57) ABSTRACT

A multiple node storage system cluster that allows for a takeover by a takeover node simultaneously with a failing node resetting its storage adapters is provided. A takeover monitor on the failing node initiates a "coredump" procedure by selecting a coredump disk. After selecting the coredump disk, the failing node determines the world wide name (WWN) of that disk and sends this information in a message across the cluster interconnect to the takeover node. In response to receipt of this message, the takeover node begins takeover procedures with respect to all disks except for the coredump disk. The failing node simultaneously resets its storage adapters and writes is memory to the coredump disk. The failing node later updates a completion header on that disk. The takeover node completes the takeover without waiting for the storage adapter reset, and subsequently reads the completion header and copies coredump information into its memory.

16 Claims, 11 Drawing Sheets

U.S. PATENT DOCUMENTS

| | | | |
|---|---|---|---|
| 7,058,858 B2* | 6/2006 | Wong et al. | 714/42 |
| 7,133,964 B2 | 11/2006 | Rodrigues et al. | |
| 7,321,982 B2* | 1/2008 | Coatney et al. | 714/4.4 |
| 7,353,434 B2 | 4/2008 | Fujimoto | |
| 7,424,637 B1 | 9/2008 | Schoenthal et al. | |
| 7,434,090 B2 | 10/2008 | Hartung et al. | |
| 7,529,885 B2 | 5/2009 | Kimura et al. | |
| 7,613,947 B1 | 11/2009 | Coatney | |
| 7,664,913 B2 | 2/2010 | Cassell | |
| 7,827,437 B1* | 11/2010 | Coatney et al. | 714/4.1 |
| 2002/0069340 A1 | 6/2002 | Tindal et al. | |
| 2003/0120743 A1* | 6/2003 | Coatney et al. | 709/217 |
| 2004/0139168 A1* | 7/2004 | Tanaka et al. | 709/213 |
| 2004/0153841 A1* | 8/2004 | Beck | 714/42 |
| 2005/0050401 A1* | 3/2005 | Matsuki et al. | 714/42 |
| 2005/0177764 A1* | 8/2005 | Cassell et al. | 714/5 |
| 2005/0177770 A1* | 8/2005 | Coatney et al. | 714/15 |
| 2007/0079172 A1* | 4/2007 | Rowe et al. | 714/6 |
| 2008/0162984 A1* | 7/2008 | Kalra et al. | 714/4 |

OTHER PUBLICATIONS

American National Standards Institute, Inc.; Fibre Channel—Arbitrated Loop (FC-AL-2), American National Standard for Information Technology, Dec. 8, 1999. 146 pages.

American National Standards Institute, Inc., Fibre Channel—Generic Services—3 (FC-GS-3), Revision 6.0; NCITS Working Draft Proposed, American National Standard for Information Technology, Nov. 24, 1999. 156 pages.

American National Standards Institute, Inc., Fibre Channel—Physical and Signaling Interface (FC-PH), American National Standard for Information Technology; Nov. 14, 1994. 430 pages.

American National Standards Institute, Inc., SCSI-3 Primary Commands (SPC), Draft Proposed, American National Standard for Information Systems, Draft Proposed, Mar. 28, 1997. 183 pages.

Bhide et al., "A Highly Available Network File Server," Proceedings of the Winter 1991 USENIX Conference, Jan. 21-25, 1991, pp. 199-205. 10 pages.

Bujanska, I., Notification of Transmittal of the International Search Report and the Written Opinion of the International Searching Authority, or the Declaration, PCT/US2005/002141, Applicant: Network Appliance, Inc., International Filing Date: Jan. 25, 2005, Date of Document Mailing: Jun. 6, 2005. 7 pages.

Bujanska, I., Notification of Transmittal of the International Search Report and the Written Opinion of the International Searching Authority, or the Declaration, PCT/US2005/002480, Applicant: Network Appliance, Inc., International Filing Date: Jan. 25, 2005, Date of Document Mailing: Sep. 13, 2005. 9 pages.

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001, 126 pages.

Fielding et al., (1999) Request for Comments (RFC) 2616, HTTP/1.1, 143 pages.

Hitz et al., File System Design for an NFS File Server Appliance, Technical Report 3002, Rev. C395, presented Jan. 19, 1994, 23 pages.

Snively, B., New Identifier Formats Based on IEEE Registration; http://standards.ieee.org/regauth/oui/tutorials/fibreformat.html; Accessed on Aug. 6, 2001.6 pages.

* cited by examiner

| CHECKSUM | 705 |
| --- | --- |
| VERSION | 710 |
| STATE | 715 |
| PROGRESS | 720 |
| WWN | 725 |
| ⋮ | 745 |

SYSTEM AND METHOD FOR RAPID INDENTIFICATION OF COREDUMP DISKS DURING SIMULTANEOUS TAKE OVER

BACKGROUND OF THE INVENTION

1. Field of the Invention

The present invention relates to network storage systems and, more particularly, to takeover procedures in clustered storage systems.

2. Background Information

A storage system is a computer that provides storage service relating to the organization of information on writeable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The file server, or filer, may be further configured to operate according to a client/server model of information delivery to thereby allow many client systems (clients) to access shared resources, such as files, stored on the filer. Sharing of files is a hallmark of a NAS system, which is enabled because of semantic level of access to files and file systems. Storage of information on a NAS system is typically deployed over a computer network comprising a geographically distributed collection of interconnected communication links, such as Ethernet, that allow clients to remotely access the information (files) on the file server. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network. By supporting a plurality of file system protocols, such as the conventional Common Internet File System (CIFS), the Network File System (NFS) and the Direct Access File System (DAFS) protocols, the utility of the filer may be enhanced for networking clients.

It is advantageous for the services and data provided by a storage system, such as a storage system node, to be available for access to the greatest degree possible. Accordingly, some storage systems provide a plurality of storage system nodes organized as a cluster, with a first storage system node connected with a second storage system node. Each storage system node is configured to take over serving data access requests for the other storage system node if the other storage system node fails. The storage nodes in the cluster notify one another of continued operation using a heartbeat signal which is passed back and forth over a cluster interconnect, and over a cluster switching fabric. If one of the storage system nodes detects the absence of a heartbeat from the other storage node over both the cluster interconnect and the cluster switching fabric, a failure is detected and a takeover procedure is initiated. It is noted that the failure is also usually confirmed by the takeover node by checking a master mailbox disk of the other storage node to confirm that it is in fact a failure of the other storage node itself and not simply a failure of the cluster interconnect coupling.

When a node fails in the clustered environment, the need arises to transfer the ownership of a volume from the failing node to another node in order to provide clients with continuous access to the disks. Thus, in order to readily transfer ownership of the disks in order to perform a takeover, many cluster configurations include the concept of partnering. Specifically, each storage system node in the cluster is partnered with a second storage system node in such a manner that the partner storage system node is available to take over and provide the services and the data otherwise provided by the second storage system node. The partner assumes the tasks of processing and handling any data access requests normally processed by the second storage system node. It is further noted that in such storage system node clusters, an administrator may desire to take one of the storage system nodes offline for a variety of reasons including, for example, to upgrade hardware, etc. In such situations, it may be advantageous to perform a "voluntary" user-initiated takeover operation, as opposed to a failover operation. After the takeover operation is complete, the storage system node's data is serviced by its partner until a giveback operation is performed.

It is also noted that, in some storage system architectures, each node in the cluster is generally organized as a network element (N-module) and a disk element (D-module). The N-module includes functionality that enables the node to connect to clients over a computer network, while each D-module connects to one or more storage devices such as the disks of a disk array. A file system architecture of this type is generally described in United States Patent Application Publication No. US 2002/0116593 entitled METHOD AND SYSTEM FOR RESPONDING TO FILE SYSTEM REQUESTS, by M. Kazar et al. (the contents of which are incorporated herein by reference in entirety).

In some configurations, an N-module may be associated with multiple D-modules. If one of such D-modules fails, then any of the other takeover D-modules may perform a takeover and begin to serve data access requests for the failed D-module. In such configurations, it may be desirable to deliver to the N-module a single view of the storage pool that a particular D-module serves, rather than exposing two sets of storage pools to the N-module (i.e., a local image of the disks being served by the takeover D-module, and a set of partner disks).

In either the partner system or the other systems, when a node detects a failure or panic, a takeover procedure is invoked. Further details regarding takeover procedures are provided in commonly owned U.S. patent application Ser. No. 10/764,809 filed on Jan. 26, 2004 by Coatney et al., for a SYSTEM AND METHOD FOR TAKEOVER OF PARTNER RESOURCES IN CONJUNCTION WITH COREDUMP, and in U.S. patent application Ser. No. 10/764,773 filed on Jan. 26, 2004, of Cassell et al., for a SYSTEM AND METHOD OF SELECTION AND COMMUNICATION OF A DISK FOR STORAGE OF A COREDUMP, both of which are incorporated herein by reference in entirety.

The nodes are configured such that when the node detects that it is failing, it saves substantially the entire contents of its memory to a spare disk. This procedure is sometimes referred to as a coredump, and the disk to which the contents are saved is referred to herein as the "coredump" disk. In the case of a clustered environment, where more than one node may be able to take control of a given disk set via ownership reservations, the coredump is only directed to owned disks of the failed node. The coredump disk is not otherwise accessible to the takeover node to begin the takeover process. Rather, the coredump disk remains occupied with the actions of the failed node in writing of the coredump. As the coredump disk must, typically, be accessed by the takeover node as part of a conventional takeover operation, the takeover node consequently delays the overall takeover process until the failing node completes its coredump. In effect, the takeover process proceeds through two sequential steps: first coredump by the failing node is completed, and then takeover by the takeover node occurs. While the two steps (coredump and takeover) proceed, the failure may actually turn from "soft" to "hard," with the failing node becoming completely inaccessible. This can occur before the takeover process is fully completed. In addition, during this delay, data handled by the failing node is inaccessible to clients, and is not made available again until takeover is complete. It is highly desirable to reduce unavailability of data from a cluster to the greatest extent possible, particularly in a block-based (SAN) environment in which clients are highly vulnerable to data unavailability. For example, if a file server does not respond within a set period of time, the SAN protocol may issue a network-wide panic, which may, in turn, lead to a total network shutdown.

In addition, prior to the coredump procedure, the failing node needs to reset its storage adapters. The storage adapters need to be reset because either the disks or the adapter itself might be in an error state, which would prevent the writing of the coredump information. Reset returns these devices to a known working state. The reset process interrupts all I/O operations to the disks that are attached to the adapter card, and then requires an initialization including an identification and handshake with each device. This whole process can take up to one minute or more.

Once this is performed, the failing node identifies a spare disk for the coredump, then updates a coredump header in an appropriate location in a data structure, e.g., a RAID label of the identified spare disk indicating that this disk has been designated as the coredump disk and that a coredump procedure is occurring.

Thereafter, the takeover node only then starts the takeover procedure by locating the disk(s) used for the coredump procedure and reading the coredump header on each disk label in a search for the disk that has a coredump header that was updated by the failing node.

In many storage configurations, the adapter reset process and the coredump disk identification process can take an excessively long time, i.e., up to one minute or more. In such a case, the takeover may be delayed by this latency, which can lead to a soft failure becoming a hard failure, as noted, and which may have a significant impact on client-data access requests and can in some cases result in the takeover being aborted, and a potential network shutdown.

There remains a need, therefore, for system and method which allows for ready identification of a coredump disk and simultaneous takeover without waiting for time-consuming tasks to be completed prior to the initiation of the takeover in a multiple node cluster.

SUMMARY OF THE INVENTION

The disadvantages of prior techniques are overcome by the present invention which provides a system and method in which a takeover node performs substantial steps for a takeover of a failed node's disks simultaneously with the failing node performing its adapter reset and coredump operations. In accordance with the invention, this takeover can occur in an overlapping fashion with the failing node's coredump process, thus eliminating the latency associated with tasks, such as storage adapter reset and coredump write process, which in prior techniques had to be performed before the takeover commenced on the takeover node.

Such a technique may be implemented in the illustrative embodiment in which, a takeover monitor running on the failing node detects an impending failure; the failing node then initiates its "coredump" procedure. The coredump procedure is carried out by a coredump process running on the storage operating system of the failing node. The coredump process selects an appropriate disk to which coredump information is to be written, i.e., the "coredump disk."

In accordance with the invention, after selecting the coredump disk, the failing node determines a name, e.g., a world wide name (WWN), of that disk by performing a lookup in data structures, such as tables, that are stored in the memory of the node. Alternatively, the coredump process instructs a storage subsystem of the node to read labels on its associated disks to determine the WWN of the coredump disk.

The coredump process then executes one or more instructions by which it inserts this information into a data structure and sends it as a message to the takeover node. This message is referred to herein as a "spare core" message. Upon receipt of the spare core message, the takeover node starts a takeover procedure by asserting SCSI reservations on all disks except the coredump disk. The absence of a SCSI reservation on the coredump disk allows the coredump information to be written to that disk by the failing node. However, because the takeover node is able to reserve the other disks, the takeover process can commence and proceed to completion while the failing node is doing its failover work.

Simultaneously, the failing node resets its storage adapters. As noted, this reset is needed because either the disks or the adapter itself might be in an error state, which would prevent the writing of the coredump information. Reset returns these devices to a known working state. In the reset process, the storage adapters interrupt I/O operations to and from the disks that are attached to the adapter card, and then perform an initialization including an identification and handshake with each device. Adapter reset can consume up to one minute or more, and in prior techniques, such a delay had been a latency factor. However, in accordance with the present invention, the latency factor is eliminated as the takeover procedure occurs simultaneously on the takeover node.

After the storage adapters are reset on the failing node, and the coredump disk has been identified, the coredump information is written to the spare, coredump disk. This information includes all of the memory contents of the failing node including, for example, RAID labels, core header information, and core data. The coredump process then updates a coredump completion header on the coredump disk, which is a persistent notation on the coredump disk that the coredump information has been written and the coredump process has completed.

While the failing node performs its coredump information process, the takeover node completes the takeover. Upon completion, the takeover monitor detects the completion of the takeover and sends a message to the coredump process on the takeover node to begin a "save core" procedure. In accordance with the save core procedure, the takeover node polls the coredump disk for a completion header. If the takeover node finds the completion header, which had been written thereon by the failing node when it finished its coredump process, the takeover node then places a SCSI reservation on the coredump disk so that the takeover node can now fully access that disk. Once it has access, the takeover node can read the coredump disk to obtain the coredump information and copy it to a save core table in its memory. An administrator may then perform work to investigate the system for errors, or the system can be brought up to a previously existing state using the coredump information when the failing node is brought back into service.

BRIEF DESCRIPTION OF THE DRAWINGS

The above and further advantages of the invention may be better understood by reference to the following description in conjunction with the accompanied drawings in which like reference numerals indicate identical or functionally similar elements.

DETAILED DESCRIPTION OF AN ILLUSTRATIVE EMBODIMENT

The present invention provides a system and method in which a takeover node can perform substantial steps towards takeover of a failing node's disks simultaneously with the failing node performing its adapter reset and coredump operations. In accordance with the invention, this takeover can occur in an overlapping fashion with the failing node's coredump process thus eliminating the latency associated with tasks, such as storage adapter reset and coredump write process, which in prior techniques had to be performed before beginning the takeover by the takeover node.

Figure 1:
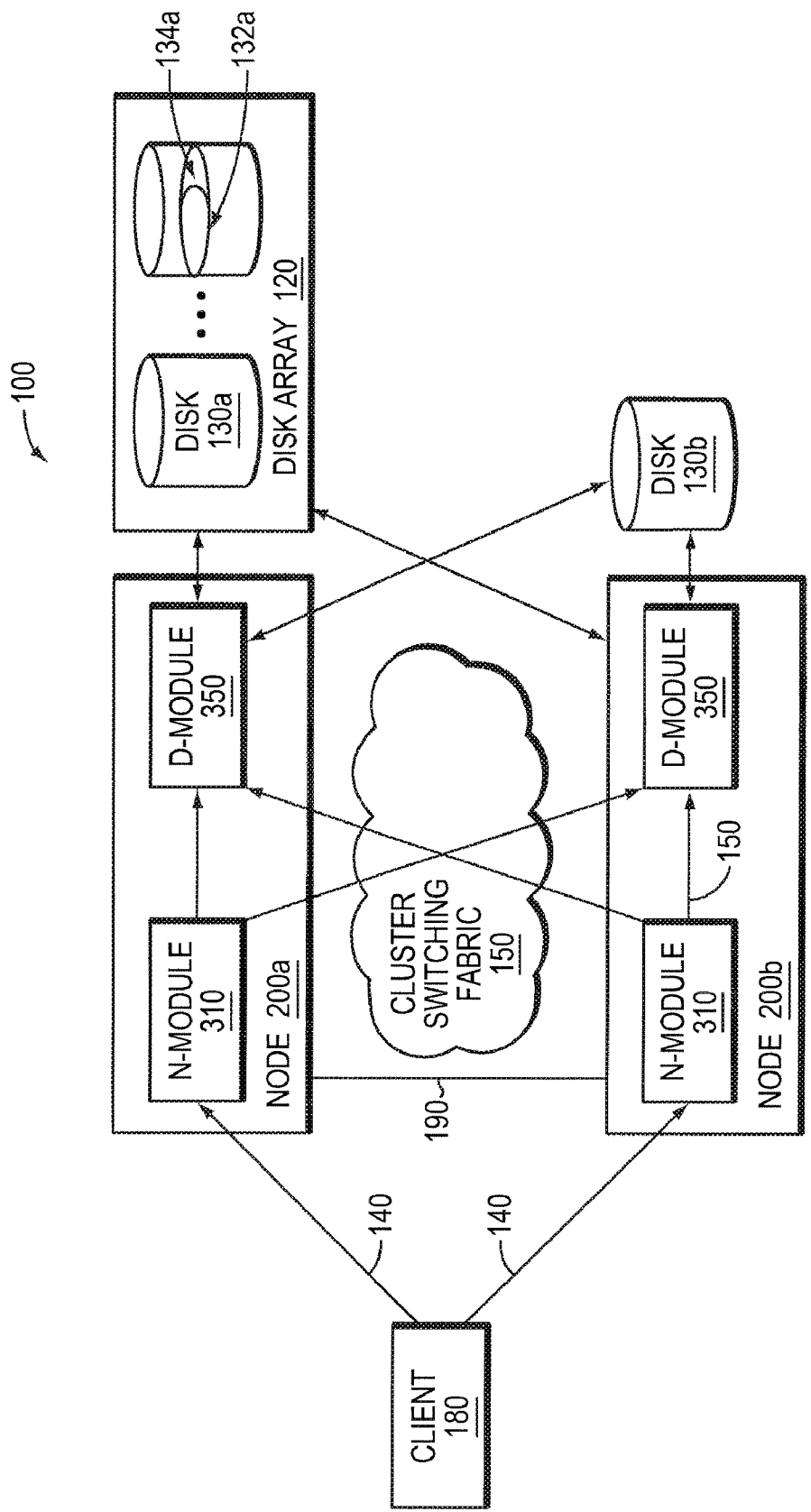
FIG. 1 is a schematic block diagram of a plurality of nodes interconnected as a cluster in accordance with an illustrative embodiment with the present invention.

FIG. 1 is a schematic block diagram of a plurality of nodes 200a,b interconnected as a cluster 100 and configured to provide storage services relating to the organization of information on storage devices. The nodes 200a,b comprise various functional components that cooperate to provide a distributed storage system architecture of the cluster 100. To that end, each node 200a,b is generally organized as a network element (N-module 310) and a disk element (D-module 350). The N-module 310 includes functionality that enables the node 200a, for example, to connect to clients 180 over a computer network 140, while each D-module 350 connects to one or more storage devices, such as disks 130a. The disks can be connected directly to the D-module as shown, or they may be connected through a storage fabric.

The nodes 200a,b are interconnected by a cluster switching fabric 150 which, in the illustrative embodiment, may be embodied as a Gigabit Ethernet switch. An exemplary distributed file system architecture is generally described in U.S. Patent Application Publication No. US 2002/0116593 entitled METHOD AND SYSTEM FOR RESPONDING TO FILE SYSTEM REQUESTS, by M. Kazar et al., published Aug. 22, 2002, which is incorporated by reference herein in its entirety. It should be noted that while there is shown an equal number of N and D-modules in the illustrative cluster 100, there may be differing numbers of N and/or D-modules in accordance with various embodiments of the present invention. For example, there may be a plurality of N-modules and/or D-modules interconnected in a cluster configuration 100 that does not reflect a one-to-one correspondence between the N and D-modules. As such, the description of a node 200a,b comprising one N-module and one D-module should be taken as illustrative only.

The nodes 200a,b are also coupled across a cluster interconnect 190 which provides an additional communication path between the nodes. The cluster interconnect 190 may be Fibre Channel (FC), InfiniBand or another suitable medium. The cluster interconnect 190 may be used to provide heartbeat signals ("heartbeats") between the two nodes, which signals are used monitor the active state of each node. The cluster heartbeats are also sent across the cluster switching fabric 150 which is sometimes also referred to as the "storage layer," over which communications between an N-module and D-module are illustratively effected through remote message passing. The "death" of a node is indicated by the loss of heartbeat from both the cluster interconnect and the storage layer. The cluster interconnect is sometimes also referred to as the storage takeover interconnect. If the heartbeat terminates (i.e., "times out"), then a takeover procedure is enabled. Additionally, the cluster interconnect 190 is employed in accordance with the present invention to transport a World Wide Name (WWN) of a spare disk to a takeover node when a takeover is initiated.

The clients 180 may be general-purpose computers configured to interact with the nodes 200a,b in accordance with a client/server model of information delivery. That is, each client may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage system node 200a is primarily responsible for the volumes of the disk array which are represented as disk 130a. Similarly, the storage system node 200b is primarily responsible for the disks in the volumes represented as disk 130b. The clustered storage system 100 is configured such that either storage system node 200a or 200b can take over data servicing capabilities for the other storage system node in the event of a failure in the manner described further herein. In some configurations, nodes 200a and 200b may be partners and a partner mode is implemented for takeover procedures. In other multiple node clusters, a failed node's disks may not all be claimed by a single takeover node. Instead, some of the disks may be claimed by a first takeover node, with the remaining disks being claimed by a second takeover node, for example. This may be used for load balancing of I/O traffic. The storage system node that assumes responsibility for a failed node's disks is referred to herein as the "takeover node."

B. Storage System Node

Figure 2:
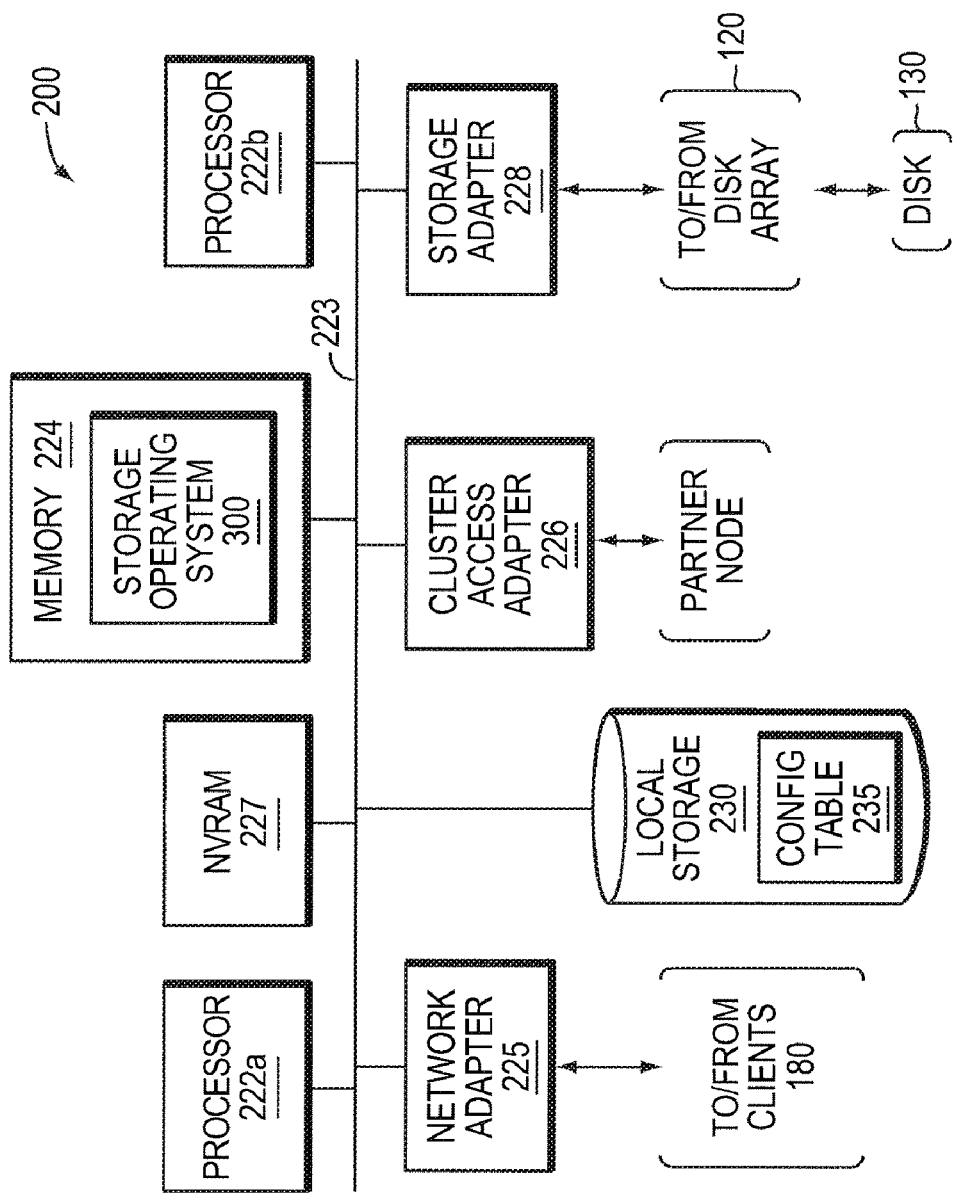
FIG. 2 is a schematic block diagram of a node in accordance with an illustrative embodiment of the present invention.

FIG. 2 is a schematic block diagram of a node 200 that is illustratively embodied as a storage system comprising a plurality of processors 222a,b, a memory 224, a network adapter 225, a cluster access adapter 226, NVRAM 227 (non-volatile random access memory), a storage adapter 228 and local storage 230 interconnected by a system bus 223. The local storage 230 comprises one or more storage devices, such as disks, which can be utilized by the node to locally store configuration information (e.g., in configuration table 235) provided by one or more management processes that execute as user mode applications (not shown). Alternatively, such information may be stored remotely. The cluster access adapter 226 comprises a plurality of ports adapted to couple the node 200 to other nodes of the cluster 100, such as a partner node. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 226 is utilized by the N/D-module for communicating with other N/D-modules in the cluster 100.

Each node 200 is illustratively embodied as a dual processor storage system executing a storage operating system 300 that preferably implements a high-level module, such as a file system, to logically organize the information as a hierarchical structure of named data containers, such as directories, files and special types of files called virtual disks (hereinafter generally "blocks") on the disks. However, it will be apparent to those of ordinary skill in the art that the node 200 may alternatively comprise a single or more than two processor system. Illustratively, one processor 222a executes the functions of the N-module 310 on the node, while the other processor 222b executes the functions of the D-module 350.

The memory 224 illustratively comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 300, portions of which are typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the invention described herein.

The network adapter 225 comprises a plurality of ports adapted to couple the node 200 to one or more clients 180 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 (FIG. 1) may be embodied as an Ethernet network or a FC network. Each client 180 may communicate with the node over network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, microelectro mechanical and any other similar media adapted to store information, including data and parity information. However, as illustratively described herein, the information is preferably stored on the disks 130 of the disk array 120. The storage adapter comprises a plurality of ports having input/output (I/O) interface circuitry that couples to the disks over an I/O interconnect arrangement, such as a conventional high-performance, FC link topology. This FC link topology must be reset when a node is failing because either the disks or the adapter itself might be in an error state, which would prevent the writing of the coredump information. Reset returns these devices to a known working state. In the reset process, the storage adapters interrupt I/O operations to and from the disks that are attached to the adapter card, and then storage adapters perform an initialization including an identification and handshake with each device. Thus, in accordance with the present invention, when the failing node, as described herein, begins its coredump procedure, it initiates a reset of the storage adapter 228. This process can be time consuming and may take up to one minute or longer. In accordance with the present invention, the takeover node performs other work while this process occurs on the failing node.

Storage of information on each disk array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data, once all of the disks in a given RAID group are assimilated. An illustrative example of a RAID implementation is a RAID-4 level implementation, although it should be understood that other types and levels of RAID implementations may be used in accordance with the inventive principles described herein.

C. Storage Operating System

To facilitate access to the disks 130, the storage operating system 300 implements a write-anywhere file system that cooperates with one or more virtualization modules to "virtualize" the storage space provided by disks 130. The file system logically organizes the information as a hierarchical structure of named data containers such as directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of data containers such as blocks on the disks that are exported as named logical unit numbers (LUNs).

In the illustrative embodiment, the storage operating system is preferably the NetApp® Data ONTAP® operating system available from Network Appliance, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this invention.

Figure 3:
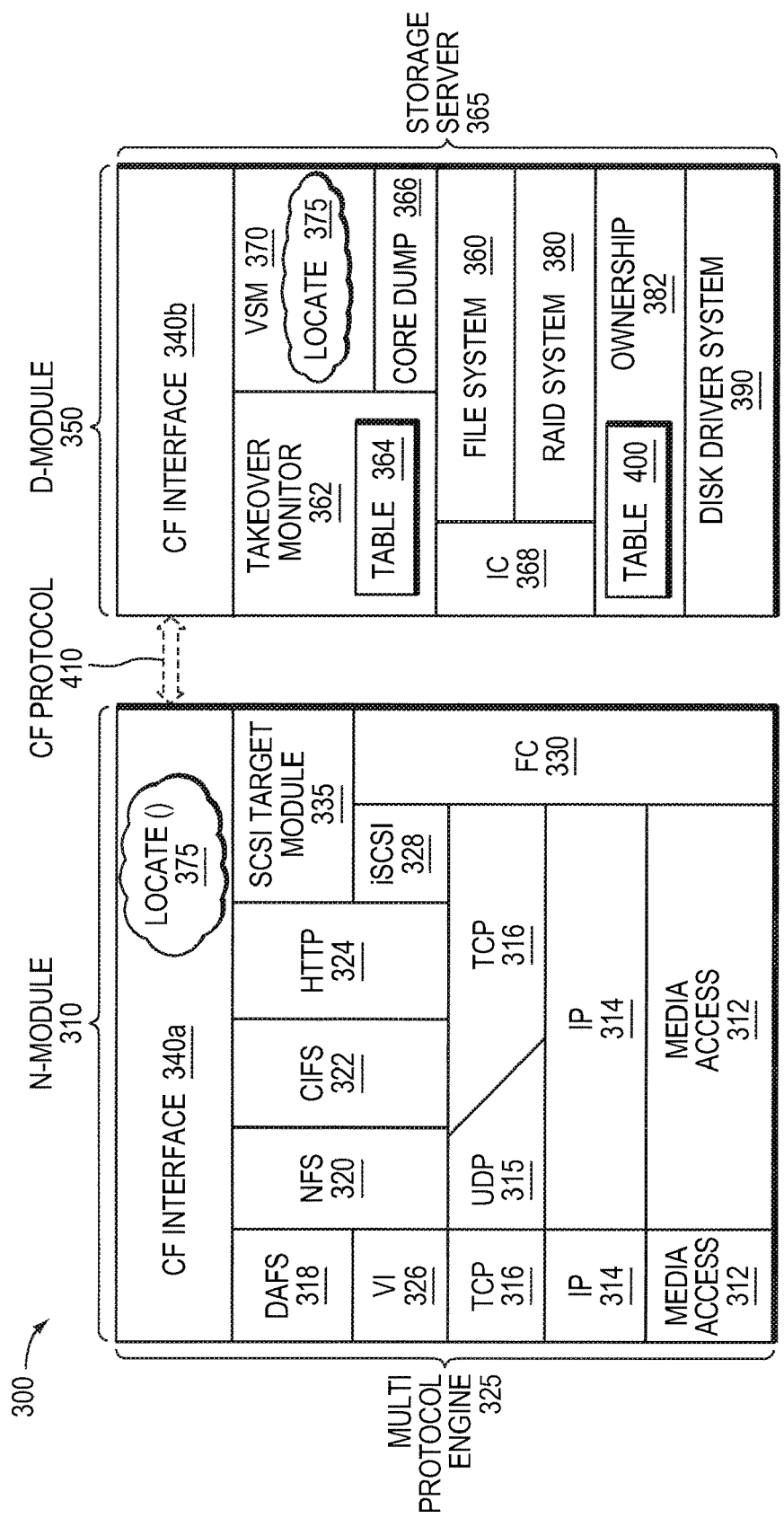
FIG. 3 is a schematic block diagram of a storage operating system that may be advantageously used with the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine 325 that provides data paths for clients to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system includes a series of software layers organized to form a storage server 365 that provides data paths for accessing information stored on the disks 130 of the node 200. As described further herein, the software layers of the storage server are illustratively embodied as a D-module 350. The storage server 365 illustratively comprises a file system 360 that includes a number of process modules and processes in order to serve data access requests and perform the tasks described further herein. For example, the file system 360 includes a takeover monitor module 362 that cooperates with a data structure, such as a takeover monitor resource table 364. It should be understood that the takeover monitor resource table 364 is not the only possible embodiment of the data structure, but it is described herein for illustrative purposes. The takeover monitor resource table 364 is configured to maintain information regarding takeover procedures, as described further herein. The file system module 360 interacts in cooperating relation with a storage subsystem. The storage subsystem includes a volume striping module (VSM) 370, a RAID system module 380, and ownership module 382 and a disk driver system module 390. The RAID system 380 manages the storage and retrieval of information to and from the volumes/disks in accordance with I/O operations, while the disk driver system 390 implements a disk access protocol such as, e.g., the Small Computer System Interface (SCSI) protocol. However, it should be understood that processes other than the RAID system 380 may in other embodiments perform such tasks while remaining within the scope of the present invention.

In a striped volume environment, the VSM 370 illustratively implements a striped volume set (SVS) and, as such cooperates with the file system 360 to enable storage server 365 to service a volume of the SVS. In particular, the VSM 370 implements a Locate( ) function 375 to compute the location of data container content in the SVS volume to thereby ensure consistency of such content served by the cluster.

The storage operating system 300 also includes a coredump function 366 which interacts with the file system 360 and the takeover monitor 362 as well as with the RAID system 380 and disk driver system 390 to facilitate the transmission of the coredump information in accordance with the teachings of this invention as described further herein. The storage server 365 also includes a cluster interconnect (IC) driver 368 which cooperates with the takeover monitor 362, the coredump process 366 and the file system 360 to perform the messaging which occurs across the cluster interconnect 190 in accordance with the invention.

The disk ownership module 382 manages ownership of the disks with respect to their related aggregates and volumes using, for example, one or more data structures such as tables, including, for example, the disk ownership table 400. In particular, the ownership module 382 cooperates with the disk driver system 390 to identify the appropriate D-module for processing data access requests for particular volumes on the disk array 120. To that end, the ownership module consults disk ownership table 400, which contains disk ownership information that is illustratively generated at boot-up time, and that is updated by various components of the storage operating system to reflect changes in ownership of disks. Further details regarding the data structure implemented as ownership table 400 are provided in the above-incorporated U.S. patent application Ser. No. 11/606,727 of Coatney, et al.

Notably, the disk ownership module 382 includes program instructions for writing proper ownership information at a proper location on each disk, which is referred to herein as the ownership location. The disk ownership module 382 also includes program instructions for asserting and eliminating SCSI reservation tags.

Figure 4:
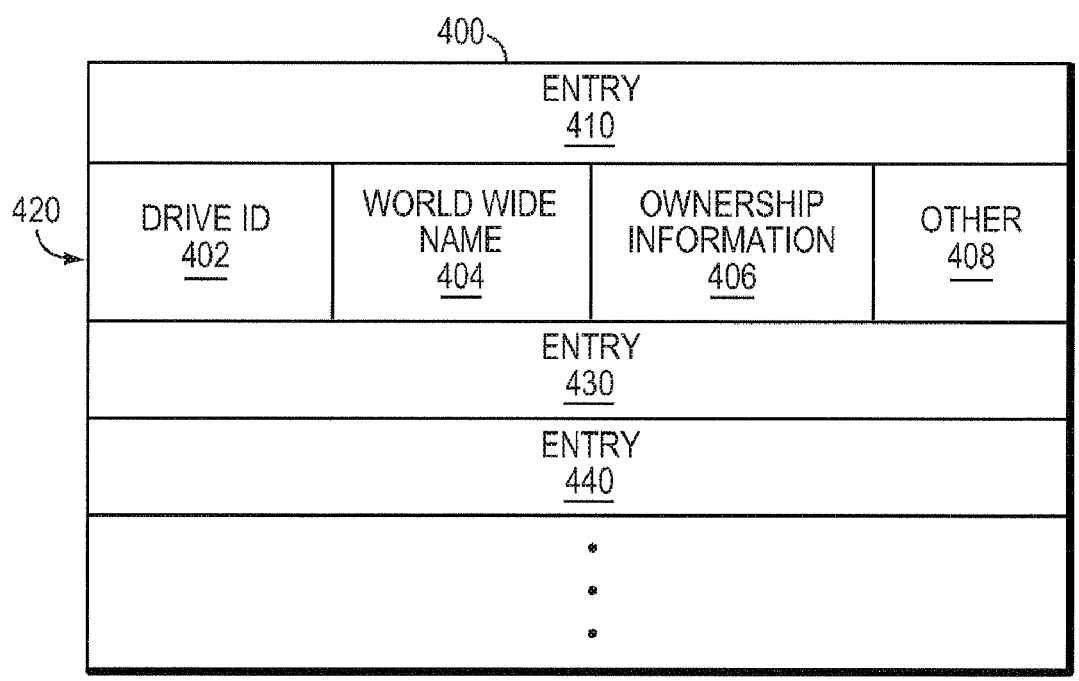
FIG. 4 is an illustrative example of a data structure implemented in a disk information table maintained by an ownership module in the storage operating system in an illustrative embodiment of the present invention.

FIG. 4 is an illustrative example of the data structure implemented as disk ownership table 400, which is maintained by the ownership module 382 of the storage operating system 300. The table comprises a plurality of entries 410, 420, 430 and 440, one for each disk accessible by the appropriate D-module. The individual fields are depicted for an illustrative entry 420, including a unique drive identification (i.e., unique ID) field 402, a world wide name field 404, ownership information field 406 and a field for other information 408. The world wide name is a 64-bit identification number which is unique for every item attached to a fibre channel network. World wide names are described in *ANSI X3.230-1995, Fibre Channel Physical and Signaling Interface (FC-PH)* and Bob Snively, *New Identifier Formats Based on IEEE Registration X3T11/96-467*, revision 2, which are hereby incorporated by reference. The world wide name is generally loaded into disk drives during manufacturing. For file servers (such as D-module 350), the world wide name is normally generated by adding additional data bits to a file server serial number identified within the NVRAM. However, it is expressly contemplated that other means for generating a world wide name (or other appropriate standardized unique naming scheme) for file servers (and D-modules) are possible, including, but not limited to adding the manufacturer's name to a processor identification, etc.

Initially, the disk ownership table 400 is generated upon boot up of the system. More specifically, I/O services of the disk driver system 390 query all devices (e.g., disks 130) attached to the system. This query requests information as to the nature of the attached disks. Upon completion of the query, the ownership module 382 instructs the disk driver system 390 to read the ownership information from each disk. In response, the disk driver system reads the ownership information for each disk 130*a* from each on-disk ownership location 134*a* (FIG. 1), and then the ownership module 382 creates the entries in the disk ownership table 400 with this information.

Subsequently, the ownership module 382 accesses the disk ownership table 400 to extract the identification of all disks that are owned by the appropriate D-module. The ownership module then verifies the SCSI reservations on each disk owned by that D-module by reading the ownership information stored in the ownership location on each disk. If the SCSI reservations and on-disk information do not match, the ownership module changes the SCSI reservation to match the on-disk ownership information. Once the SCSI reservations and on-disk ownership information match for all disks identified as owned by the D-module, the ownership module 382 passes the information to the file system and the RAID system, which configure the individual disks into the appropriate RAID groups and volumes for the D-module 350.

Referring again to FIG. 3, the takeover monitor module or process 362 operates in conjunction with a cluster fabric (CF) interface module 340*b* to monitor the heartbeats between the node and the one or more other nodes in the cluster. If the absence of a heartbeat is detected, the takeover monitor process 362 initiates a takeover procedure. In addition, the takeover monitor is responsive to a storage takeover command by, e.g., an administrator. In response to lack of heartbeat or issuance of a storage takeover command, the takeover procedure is triggered at the takeover monitor process 362. When initiating the takeover, the takeover monitor process 362 first consults takeover monitor resource table 364, which sets forth the routines to be followed in order to effect a takeover. These routines are summarized illustratively in the flowchart of FIGS. 14A-14D. The takeover monitor process 362 thereafter notifies other processes, such as the file system 360, the RAID system 380, the ownership module 382 and the disk driver system 390, instructing each to perform respective routines/threads that are necessary steps, which steps are illustratively illustrated herein in the flowchart of FIGS. 14A-14D, to implement the takeover procedures, in the manner described herein.

The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework, in response to a user (system administrator) issuing commands to the node 200. The SCSI target module 335 is generally disposed between the FC 330 and iSCSI drivers 328 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL® file system (hereinafter generally the "write-anywhere file system") having an on-disk format representation that is block-based using, e.g., 4 kilobyte (kB) blocks and using index nodes ("modes") to identify files and file attributes (such as creation time, access permissions, size and block location). The file system uses files to store metadata describing the layout of its file system; these metadata files include, among others, an mode file. A file handle, i.e., an identifier that includes an mode number, is used to retrieve an mode from disk.

Broadly stated, all modes of the write-anywhere file system are organized into the mode file. A file system (fs) info block specifies the layout of information in the file system and includes an mode of a file that includes all other modes of the file system. Each logical volume (file system) has an fsinfo block that is preferably stored at a fixed location within, e.g., a RAID group. The mode of the mode file may directly reference (point to) data blocks of the mode file or may reference indirect blocks of the mode file that, in turn, reference data blocks of the mode file. Within each data block of the mode file are embedded modes, each of which may reference indirect blocks that, in turn, reference data blocks of a file.

Operationally, a request from the client 180 is forwarded as a packet over the computer network 140 and onto the node 200 where it is received at the network adapter 225. A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 130 if it is not resident "in core", i.e., in memory 224. If the information is not in memory, the file system 360 indexes into the mode file using the mode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, and a storage area network and disk assembly directly attached to a client or host computer. The term "storage system" should therefore be taken broadly to include such arrangements in addition to any subsystems configured to perform a storage function and associated with other equipment or systems. It should be noted that while this description is written in terms of a write-anywhere file system, the teachings of the present invention may be utilized with any suitable file system, including a write-in-place file system.

E. File System Organization

Figure 5:
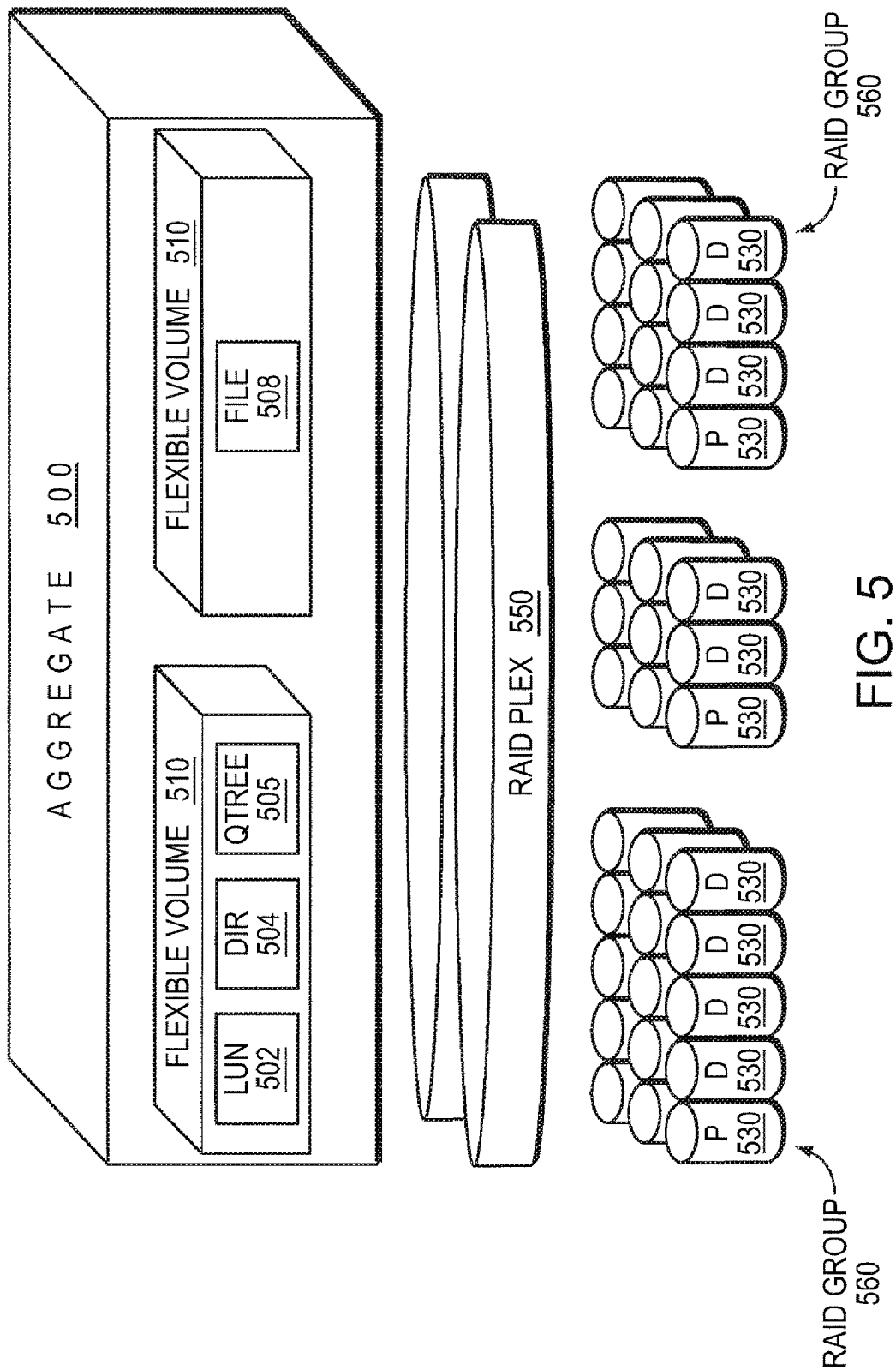
FIG. 5 is a schematic block diagram of an exemplary aggregate in accordance with an illustrative embodiment of the present invention.

FIG. 5 is a schematic block diagram of an embodiment of an aggregate 500 (which may also be a data container, such as a physical volume) that may be advantageously used with the present invention. Luns (blocks) 502, directories 504, qtrees 506 and files 508 may be contained within flexible volumes 510, such as dual vbn flexible volumes, that, in turn, are contained within the aggregate 500. The aggregate 500 is illustratively layered on top of the RAID system, which is represented by at least one RAID plex 550 (depending upon whether the storage configuration is mirrored), wherein each plex 550 comprises at least one RAID group 560. Each RAID group further comprises a plurality of disks 530, e.g., one or more data (D) disks and zero or more (P) parity disks.

Whereas the aggregate 500 is analogous to a physical volume of a conventional storage system, a flexible volume is analogous to a file within that physical volume. That is, the aggregate 500 may include one or more files, wherein each file contains a flexible volume 510 and wherein the sum of the storage space consumed by the flexible volumes is physically smaller than (or equal to) the size of the overall physical volume. The aggregate utilizes a physical pvbn space that defines a storage space of blocks provided by the disks of the physical volume, while each embedded flexible volume (within a file) utilizes a logical vvbn space to organize those blocks, e.g., as files. Each vvbn space is an independent set of numbers, each of which corresponds to an offset within the file. These offset values are then translated to dbns on disks. Since the flexible volume 510 is also a logical volume, it has its own block allocation structures (e.g., active, space and summary maps) in its vvbn space.

A container file is a file in the aggregate that contains all blocks used by a flexible volume. The container file is an internal (to the aggregate) feature that supports a flexible volume; illustratively, there is one container file per flexible volume. Similar to a pure logical volume in a file approach, the container file is a hidden file (not accessible to a user) in the aggregate that holds every block in use by the flexible volume. The aggregate includes an illustrative hidden metadata root directory that contains subdirectories of flexible volumes:

WAFL/fsid/filesystem file, storage label file

Specifically, a physical file system (WAFL) directory includes a subdirectory for each flexible volume in the aggregate, with the name of the subdirectory being a file system identifier (fsid) of the flexible volume. Each fsid subdirectory (flexible volume) contains at least two files, a file system file and a storage label file. The storage label file is illustratively a 4 kB file that contains metadata similar to that stored in a conventional RAID label. In other words, the storage label file is the analog of a RAID label and, as such, contains information about the state of the flexible volume such as, e.g., the name of the flexible volume, a universal unique identifier (uuid) and fsid of the flexible volume, whether it is online, being created or being destroyed, etc.

G. Coredump Process

As used herein, a node in a cluster configuration "panics" or "fails" when it detects some fatal problem which prevents it from continuing to execute normally, but is nonetheless able to communicate with other nodes in the cluster, including its cluster partner. Thus, there is a continued ability to communicate in the cluster despite loss of some functionality or performance. This can also be called "soft failure" as distinguished from "hard failure," which occurs when the node becomes unable to communicate with other nodes in the cluster, for example, upon loss of electrical power. Hence, a node in which its storage operating system panics is generally referred to herein as the "failing node." When a node fails in a clustered environment, the need arises to transfer the ownership of a volume from the failing node to another partner node in order to provide clients with continuous access to the disks. In order to assist in ascertaining the cause of the fault (e.g. to "debug" the failed node), the failed node or other storage system typically performs a "coredump procedure," in which it writes its current working memory (also termed, the "coredump") contents to disk. Later, a coredump recovery process called "savecore" reads back the coredump information and generates a "coredump file," which it stores in the root file system on one of the nodes in the cluster. The coredump file contains an image of the system memory and any non-volatile storage at the time the panic occurred. The image can be subsequently accessed and studied to assist in determining the cause of the failure event. This information assists in diagnosing the fault since it is a view of the system at the time the failure occurred.

In some embodiments of the coredump procedure or operation, the coredump is spread across specially allocated core regions located on multiple disks. Typically, the coredump file is written in (for example) 3-MB data chunks to the designated region in a set of non-broken/operative disks currently owned by the failed node. When the designated region on a given disk fills up, that disk is taken out of the list of available disks. The 3-MB data chunks written to disks are typically uncompressed where space permits, or can be compressed where space is at a premium—and this compressed data can be written out sequentially to disks, rather than "sprayed" across the disk set, potentially filling some disks before others. Disks are numbered so that a resulting coredump file can be reassembled from the disk set at a later time. These disks are collectively referred to herein as the "coredump disk."

In the case of a clustered environment, where more than one node may be able to take control of a given disk set via ownership reservations, the coredump is only directed to owned disks of the failed node. The coredump disk is not otherwise accessible to the takeover node to begin the takeover process. Rather, the coredump disk remains occupied with the actions of the failing node in writing of the coredump. In accordance with the conventional approach, the coredump disk must, typically, be accessed by the takeover node as part of a conventional takeover operation, thus the takeover node consequently delays the overall takeover process until the failing node completes its coredump. In effect, the takeover process proceeds through two sequential steps: first coredump by the failing node is completed, and then takeover by the takeover node occurs. While the two steps (coredump and takeover) proceed, the failure may actually turn from "soft" to "hard," with the failing node becoming completely inaccessible before takeover is fully completed. In addition, during this delay, data handled by the failing node is inaccessible to clients, and is not made available again until takeover is complete. It is highly desirable to reduce unavailability of data from a cluster to the greatest extent possible, particularly in a block-based (SAN) environment in which clients are highly vulnerable to data unavailability. For example, if a file server does not respond within a set period of time, the SAN protocol may issue a network-wide panic, which may, in turn, lead to a total network shutdown. Thus, to avoid undesirable (and potentially crippling) downtime, the overall takeover operation, including coredump, should be performed as quickly as possible.

Figure 6:
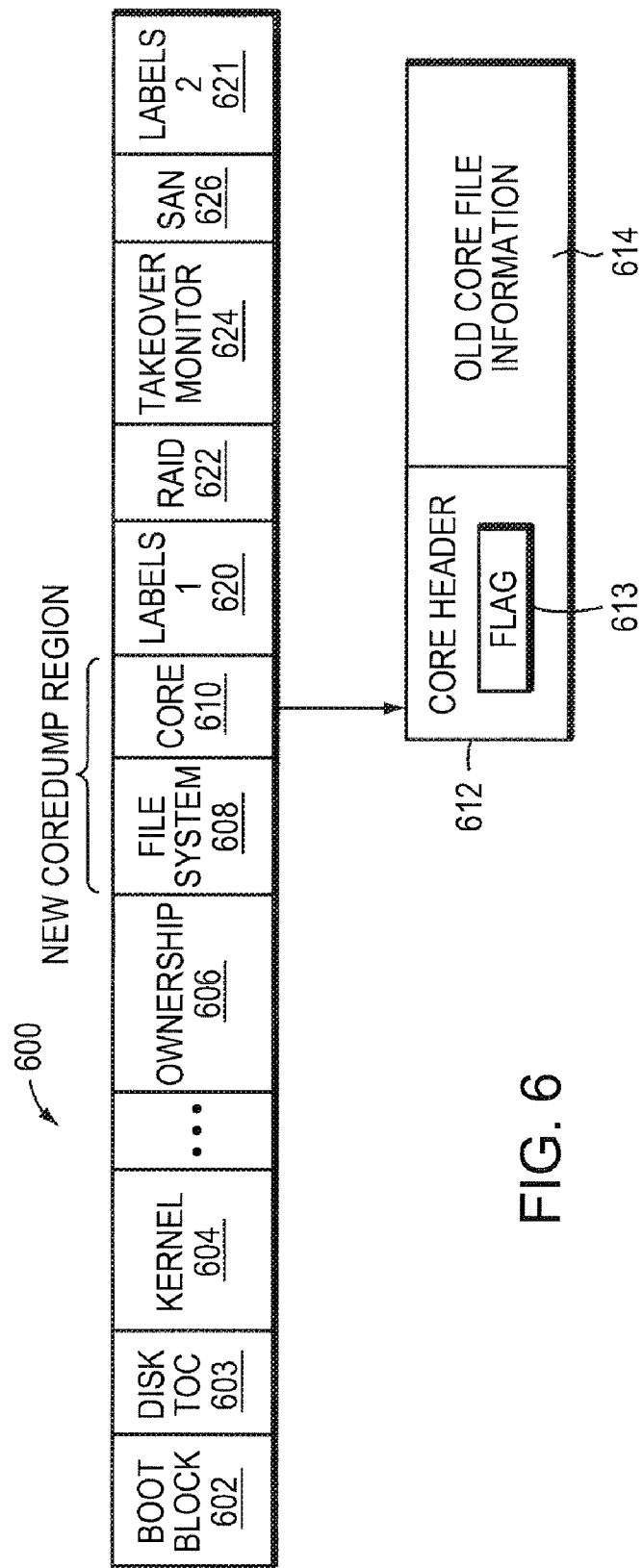
FIG. 6 is a schematic block diagram of the mapping of regions of a storage disk as used in an illustrative embodiment of the present invention.

In order to effect the coredump procedure by writing the coredump information on the coredump disk, the disks have been provided with regions to aid in this process. These disk regions are set forth in FIG. 6. More specifically, each disk contains a header information region at a standardized sector location that is known to the storage operating system. Various entries relative to the disk are provided at fixed offsets within this known region. As shown in FIG. 6, an exemplary disk is mapped out according to its storage regions 600. The RAID system generally implements this mapping 600.

For example, a bootblock region 602 is illustratively contained in the first 1 KB block and is reserved for storing information about how to use a kernel region 604 on this disk, such as whether a valid kernel is present in the kernel region. The region 603 contains the disk TOC (Table of Contents). The TOC is located at a fixed offset from the beginning of the disk so it can be easily located. Within the TOC structure is provided the location of the coredump information, which includes information on the existence of a coredump within the disk. Further, within the disk label regions (620 and 621, described further below) information is stored that identifies the disk as a spare disk, or if the disk is in use for normal file service. If the latter is the case (normal file service), then additional information exists indicating the RAID group, plex, mirror and volume with which the disk is associated. The TOC region 603 may also include essential information about the disk required by certain versions of the storage operating system, including a flag that indicates whether the disk is in use for normal file services and the physical size of the disk.

The kernel region 604 typically occupies the next area on the disk, and in one example, occupies approximately 20-MB of storage. This kernel region provides the area for storing appropriate portions of the storage operating system kernel. A failover sector is provided in accordance with this embodiment, and is described below.

The disk also contains disk ownership regions 606 that are mapped out over three blocks and provide information regarding disk ownership by volumes and file servers and (an illustrative embodiment) by respective storage area networks (SANs).

Following the ownership regions 606, is the file system region 608 that is used by the file system to store file system data (e.g. data related to files and directories). The file system region extends to almost the physical end of the disk's usable storage sectors.

Note that the bootblock region 601, the TOC region 603, the kernel region 604, the ownership region 606, and the file system region 608 are always at a fixed offset from the physical beginning of the disk so as to be readily and reliably locatable.

Following the file system region 608 is the core region 610. This region is formed from excess free space at the physical end of the disk. The core region 610 contains a header 612 having a flag 613. The flag comprises the first few bytes of the header where it is readily located and scanned by both the failed and takeover nodes. This flag is, in essence, a coredump attribute designating whether or not a coredump is present, along with other status data. For example, the attribute might take the values of "no coredump," "coredump in progress," or "coredump complete." Hence, by scanning this attribute, a takeover node determines whether it may initiate a takeover of a particular disk by checking its coredump attribute status and then placing reservations on inactive disks.

The remaining region 614 of the core region 610 is used to store a portion of the coredump as described herein. This region 614 is insufficient in size to store the entire coredump, however. A larger region is provided as described below, nevertheless, the header 612 and flag remain in place so as to be readily locatable by the operating system.

In the illustrative embodiment, additional regions are provided following the core region 610. As noted generally above, disk label 1 region (620) and label 2 region (621) are provided. In order to reduce the chance that both labels are destroyed by a disk corruption event, the label regions (620 and 621) are spaced apart. In this example, after label 1 region (620), a region 622 of 1 MB is reserved for use by the RAID system. In addition, following the RAID region 622 a takeover monitor region 624 is provided for use in connection with the various functions of the takeover monitors of both the filer and its cluster partner. In the case of a pair of clustered filers, 1 MB is provided in this region 624 for each filer (thereby totaling 2 MB). Also, an exemplary SAN region 626 is provided after the takeover monitor region 624. This region is used generally in connection with SAN functions, and is not further described herein.

Note that the regions at the end of the disk that follow the core region 610 are also located at a fixed offset from the physical end of the disk. In general, while a particular layout for disk regions is shown and described, this is only one illustrative example and a variety of layouts with a variety of types of regions can be provided. Some regions may be at fixed offset, while others are variable and utilize (for example) pointers for data indexing. In addition, the nature and information content of the regions provided on the disk can be varied. In alternate embodiments, specialized/discrete regions can be provided for specific information types. Similarly, certain disk information can be included in other regions than those in which such information is contained in this example. In general, the disk should provide a mapping of regions that leads to (among other goals) a predictable identification of contents, the existence of coredump data and status of such data.

As described in further detail herein, when a coredump disk is to be selected, the RAID system 380 of the failing node initially reads the disk labels of all connected disks and caches the information in its memory for later use as mentioned herein. Using the cached labels, spare disks are identified within the overall set of disks and then the labels of these spares are further searched to locate a spare that is not formatted for file system use. This serves to locate the selected spare disk to be used as the coredump disk. The takeover monitor then searches among the cached labels for a core region among the non-formatted spares for one containing an indication that it is a coredump disk. The identity of this flagged coredump disk is noted by the file system of the failing node. Moreover, upon completion of reading all core headers in the applicable group, the coredump procedure makes the positive determination of the coredump disk based upon each of the search criteria.

Once this search is completed and the coredump disk is selected, the takeover monitor directs the RAID system and the disk driver system to read the WWN of the coredump disk from an ownership field 606 on the disk. Alternatively, the takeover monitor 362 looks this information up in the ownership table entry 400 stored in memory on the failing node. Then, this information is used in a data structure that is sent to the takeover node across the cluster interconnect.

Figure 7:
FIG. 7 is a schematic block diagram of the data structure that is passed across the cluster interconnect accordance with an illustrative embodiment of the present invention.
Figure 8A:
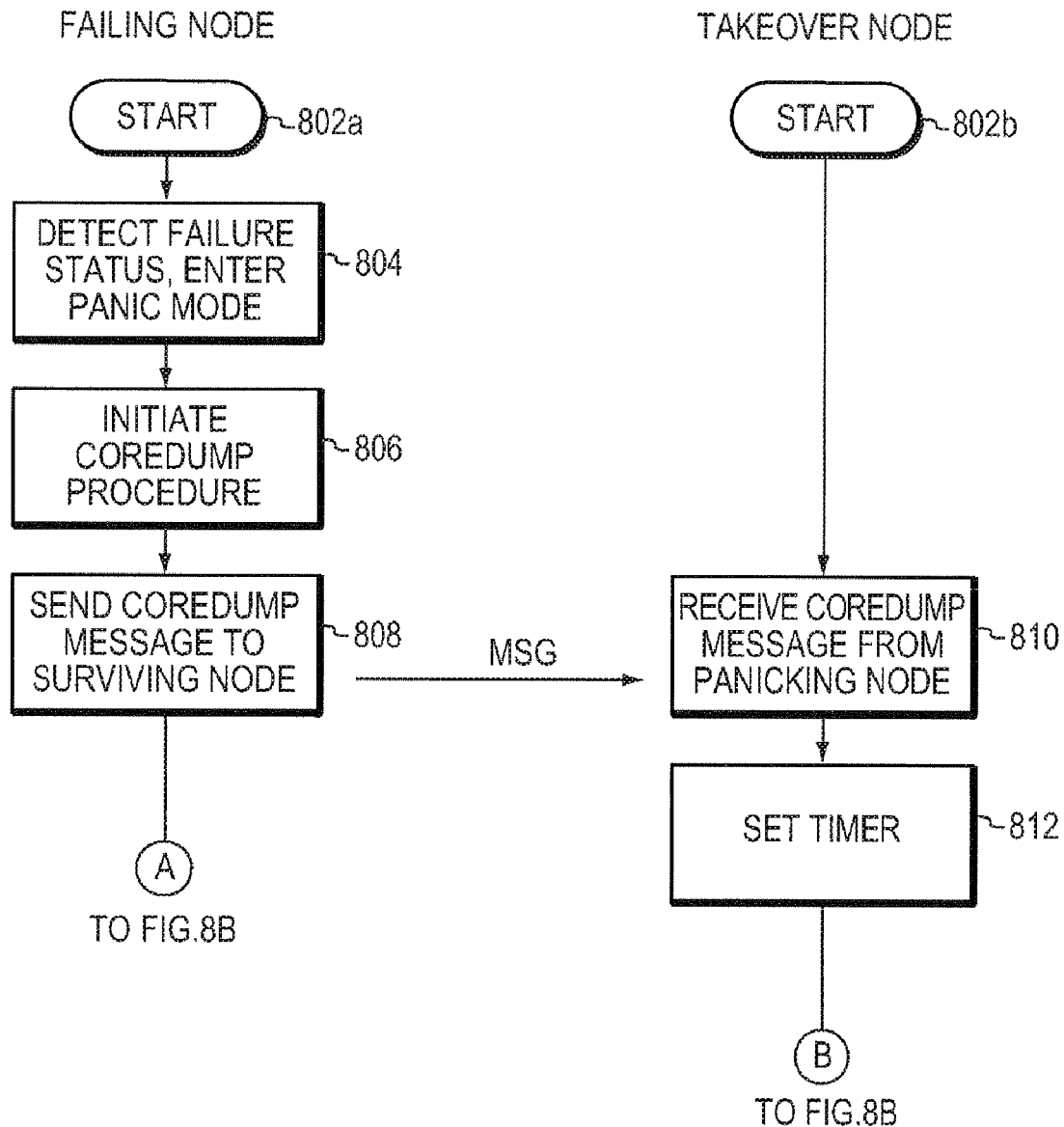
FIGS. 8A, 8B, 8C and 8D form a flowchart of a procedure for takeover operations in accordance with an illustrative embodiment of the present invention.
Figure 8B:
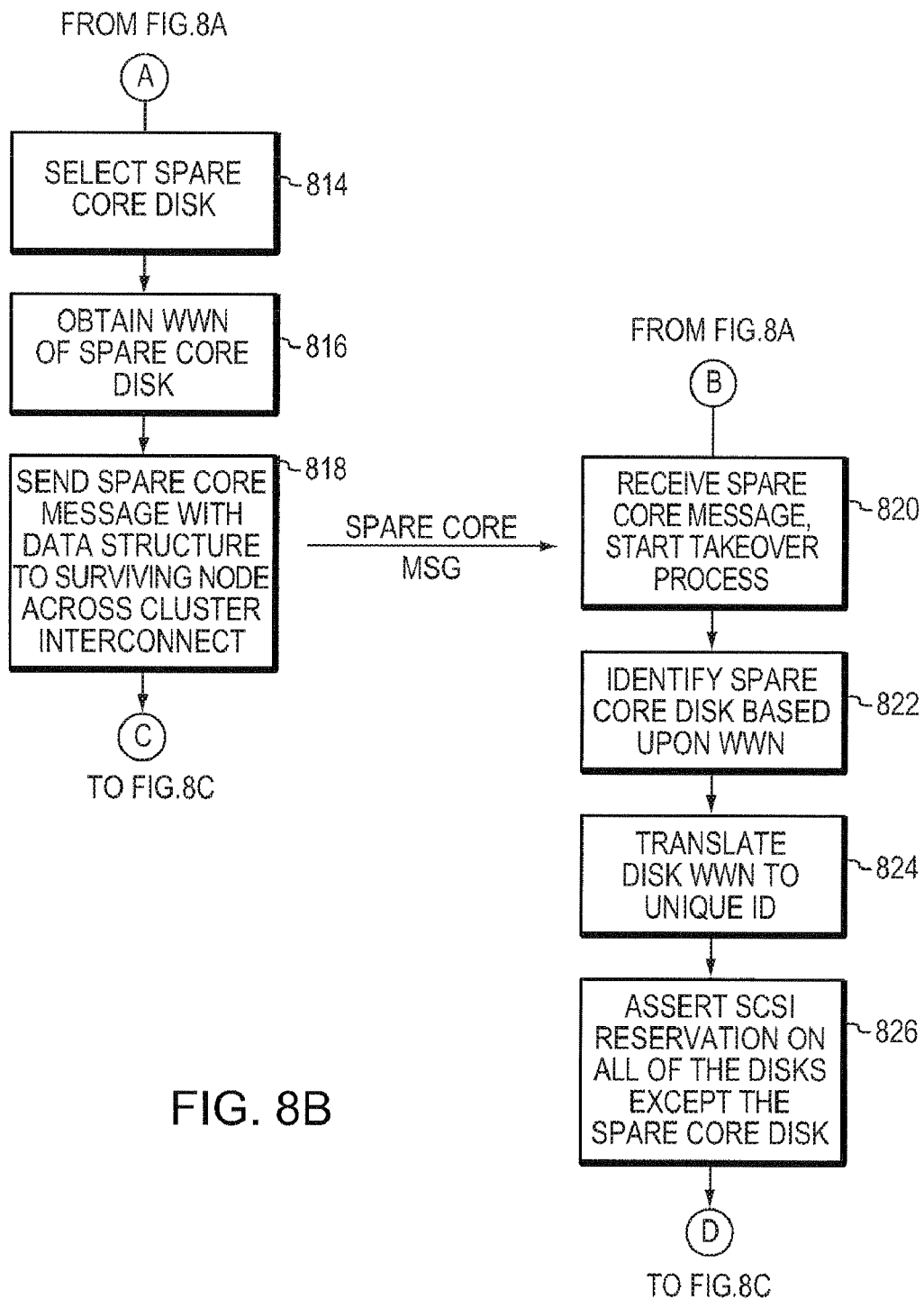
Figure 8C:
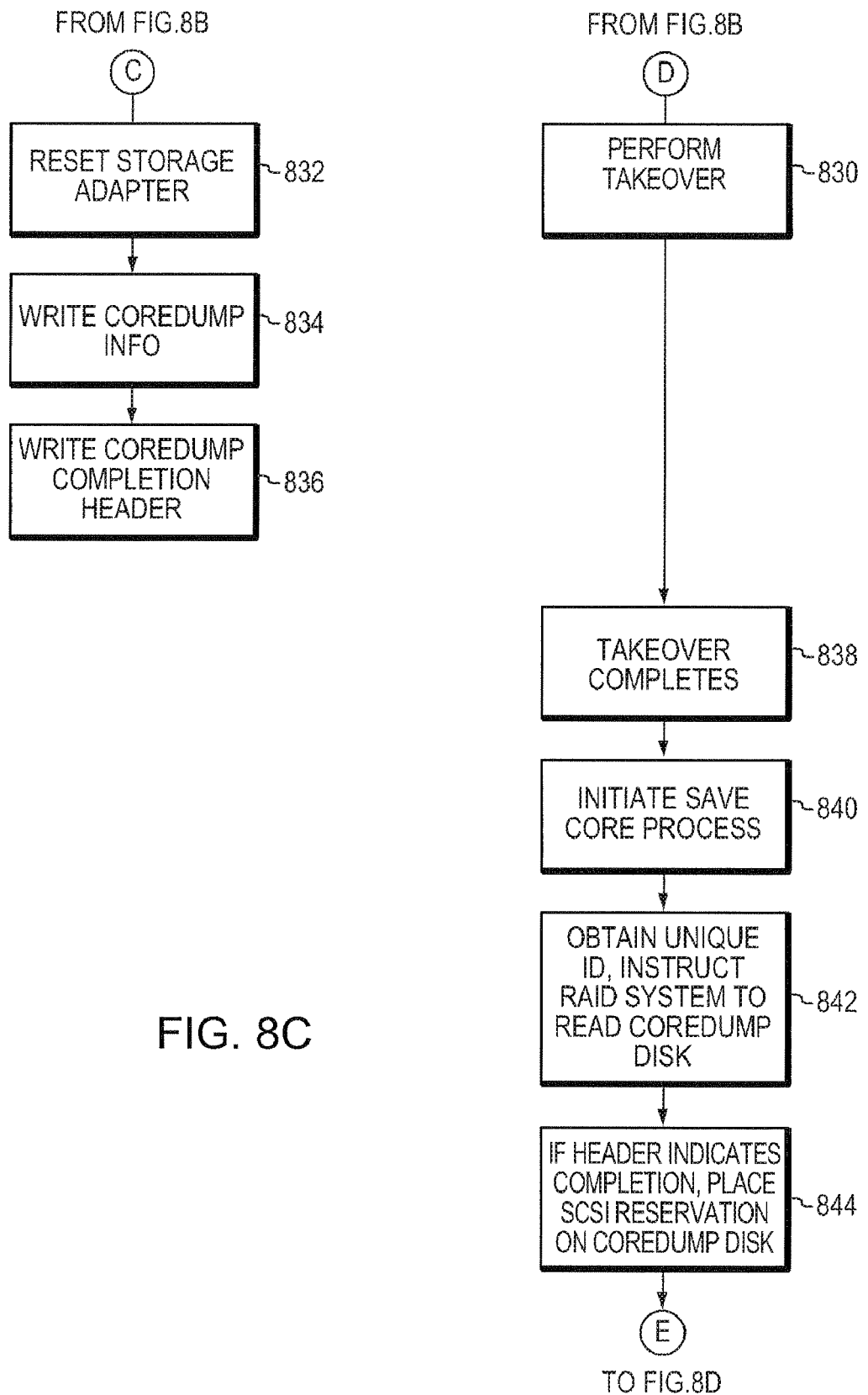
Figure 8D:
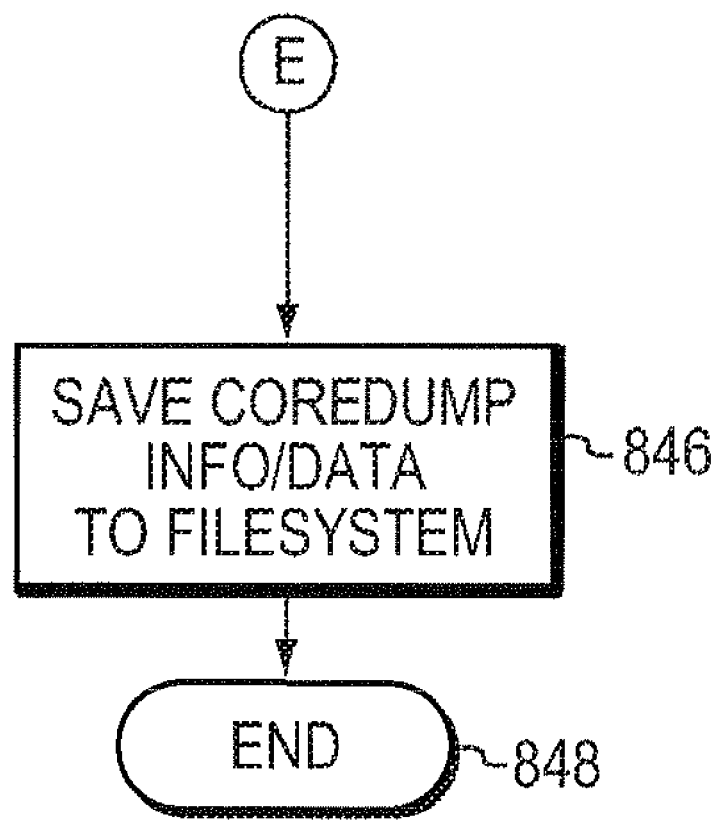

FIG. 7 is a schematic block diagram of an illustrative memory data structure 700 used for this purpose in accordance with the invention. Though other fields may be contained in other embodiments of the invention, the illustrative data structure 700 of FIG. 7 includes a checksum field for 705, a version field 710, a state field 715, a progress field 720, and a world wide name (WWN) 725. In alternative embodiments, additional fields 745 may be included. The checksum field 705 contains a checksum value that is utilized by the storage operating system to verify that the state data structure 700 has not been corrupted by, for example, a memory error. A version field 710 identifies the version of the storage operating system executing on the failing node. The state field 715 identifies a current state of the storage operating system during the coredump process. The progress field 720 contains a monotonically increasing value that is updated throughout the initialization progress. In accordance with the illustrative embodiment of the invention, the data structure 700 also includes a world wide name field 725 which is the world wide name of the coredump disk that has been identified as described herein with respect to the takeover and associated coredump procedure. In accordance with the present invention, the state field 715 contains the status of the firmware. The WWN field 725 field as noted contains the WWN of the coredump disk.

FIGS. 8A-8D form a flowchart of a procedure 800 in accordance with the present invention. More specifically, the procedure occurring on the failing node is set forth on the left hand column of FIGS. 8A-8D and the procedure simultaneously being followed on the takeover node is set forth in the right hand column of FIGS. 8A-8D. The procedure begins in step 802 (a,b) and continues to step 804 on the failing node. In step 804, a failure is detected or otherwise triggered and the failing node enters panic mode in which the coredump process is notified that a failure is occurring and that the coredump process should be initiated. This is illustrated by the step 806. In accordance with the invention, upon initiation of the coredump procedure the coredump process sends a coredump message to the takeover node using an appropriate protocol message and passes this message across the cluster switching fabric 150 to the takeover node, as in step 808.

In step 810, the takeover node receives the coredump message from the failing node and in turn, proceeds to step 812 in which it sets a timer. The timer is set to notify the takeover node to read the coredump header on the coredump disk at the appropriate time, in order to determine if the coredump completion header has been updated by the failing node, which indicates that the failing node has completed its coredump work and the takeover node can then access the coredump disk.

In the meantime, on the failing node in step 814, the failing node selects the coredump disk. As described above, when the panic occurs and the coredump process is initiated, the coredump process 366 notifies the storage subsystem to read the disk labels of all connected disks and to cache the information in memory. The coredump procedure identifies any spare disks within the overall set of disks and the labels for these disks are further examined to locate the coredump disk. The identity of the coredump disk is determined from this investigation, and then the flag 613 is updated in the coredump header 612 of the coredump disk. For example, the flag 813 is the first several bytes of the header, and one value of the flag is used to indicate that a coredump is in progress on that disk. Other criteria may be used for selection of the coredump disk depending upon on the needs of the system at the time and upon the particular application of the invention.

Once the coredump disk is selected based upon the coredump information in the core region, an entry 400 in the ownership table is checked for that disk (FIG. 4). This entry includes the drive ID 402, and the world wide name 404. The world wide name is retrieved from this table entry as shown in step 816 on the failing node. This world wide name is then entered into the world wide name field 725 of the data structure 700 of FIG. 7 and a message containing this data structure is sent across the cluster interconnect 190 by the interconnect driver 368 in step 818. This message is referred to herein as the spare core message.

On the takeover node, the spare core message is received in step 820 and the takeover process is then commenced. The takeover process includes asserting SCSI reservations on the disks to be taken over. However, as part of the takeover process, in accordance with the present invention, the takeover monitor 362 checks the spare core message for the world wide name field 925 (step 822). Using this WWN, the takeover monitor 362 instructs the ownership module 382 to look up this disk in the ownership table 400 and obtain the unique ID of the disk (as in field 402 of ownership table 400) in step 824. The coredump process 366 on the takeover node then stores this unique ID for later use. The takeover monitor on the takeover node passes the unique ID of all other disks to the disk driver system 190 and instructs it to assert SCSI reservations on all of the disks except the coredump disk, as identified by the unique ID, as shown in step 826. The takeover is then performed as shown in step 830.

While the takeover is being performed on the takeover node, the failing node resets its storage adapters in step 832. Once this reset has occurred, the failing node writes the coredump information to the coredump disk which it has previously selected (step 834). Illustratively, this coredump information includes, for example, the RAID labels from the disks with which it is associated, the core headers from each disk and the core data which is essentially the entire memory contents of the failing node when the failure occurred. This information is useful to an administrator who is investigating the cause of the failure or for bringing the storage system back up to the state in which it had been running prior to the occurrence of the error, or to duplicate the failing node's memory on a new node, for example. After the coredump information is written in accordance with step 834, the procedure continues to step 836 in which the coredump completion header is updated in the coredump header on the coredump disk.

On the takeover node, the timer which had been set earlier elapses and the takeover completes, as shown in step 838. Upon the elapse of the timer, a save core process of the coredump utility 366 is initiated as in step 840. In the save core process the takeover node reads the unique ID of the coredump disk which it has obtained by translating the world wide name to the unique ID and instructs the storage subsystem to read the header on the coredump disk, as in step 842. If the coredump completion header exists, meaning that the coredump process has been completed on the failing node such that all of the coredump data has been written to that disk, the takeover node then places a SCSI reservation on the coredump disk as in step 844. Once the SCSI reservation has been placed on the coredump disk, the coredump information is then saved to the file system on the takeover node in step 846. The procedure then ends at step 848.

Advantageously, the present invention enables a takeover to be performed on a takeover node in an overlapping fashion with the failing node performing its tasks including adapter reset and coredump information writing to its coredump disk. More specifically, the takeover can be performed while the storage sub-system on the failing node is resetting. Thus, the takeover node can perform substantial steps towards effecting a takeover simultaneously with adapter reset and coredump on the failing node, without negatively impacting takeover time.

The foregoing description has been directed to particular embodiments of the invention. It will be apparent, however, that other variations and modifications may be made to the described embodiments, with the attainment of some or all of their advantages. Specifically, it should be noted that the principles of the invention may be implemented in a non-distributed file system. Furthermore, while this description has been written in terms of D and N-modules, the teachings of the present invention are equally suitable to systems where the functionality of the N- and D-modules is implemented in a single system. Alternatively, the functions of the N- and D-modules may be distributed among a number of separate systems, wherein each system performs one or more functions. Additionally, the features of the present invention have been described with respect to a cluster which contains two nodes, however, it is equally applicable to clusters including a plurality of nodes, which allow for n-way fail over. Additionally, the procedures, processes and/or modules described herein may be implemented in hardware, software, embodied as a computer readable medium having program instructions, firmware, or a combination thereof. Therefore, it is the object of the appended claims to cover all such variations and modifications as come within the true spirit and scope of the invention.

What is claimed is:

1. A method for performing a takeover of storage devices of a failing node in a clustered storage system, comprising:
    at a failing node, detecting a failure status, and initiating a coredump process and sending a message to a takeover node notifying the takeover node of the coredump process;
    at a failing node, selecting a storage device for the coredump and obtaining unique storage device identification information of coredump storage device;
    at a failing node, generating a message that includes said unique storage device identification information and sending the message across a cluster interconnect to the takeover node in the cluster;
    at the takeover node, upon receipt of said message from the failing node, said takeover node starting a takeover process simultaneously with said failing node performing said coredump process including resetting one or more storage adapters at said failing node simultaneously with said takeover node asserting reservations on the storage devices excluding the coredump storage device, and
    at the failing node, performing a coredump write process, and at said takeover node, further obtaining said unique storage device identification information and asserting reservations on the coredump storage device.

2. The method as defined in claim 1 wherein said unique storage device identification information includes a world wide name.

3. The method as defined in claim 1 further comprising resetting at said failing node storage adapters while said takeover node is asserting SCSI reservations on the storage device, excluding a coredump storage device.

4. The method as defined in claim 1 further comprising, upon receiving said message at said takeover node, setting a timer, the elapse of which triggers said takeover node to begin polling said coredump storage device for a completion header.

5. The method as defined in claim 4 further comprising at said takeover node:
    the takeover node polling said coredump storage device for said completion header and in response to finding said completion header, placing a reservation on said coredump storage device; and
    copying the coredump information from said coredump storage device into core memory on the takeover node.

6. The method as defined in claim 1 further comprising wherein said unique storage device identification information of said coredump storage device is a world wide name and at said failing node, obtaining said world wide name of the coredump storage device, and sending said world wide name in a message to said takeover node;
    upon receipt of said message at said takeover node, translating said world wide name into unique storage device identification information; and
    passing said unique storage device identification information to an associated storage device driver system which asserts SCSI reservations on storage devices other than the coredump storage device as identified.

7. The method as defined in claim 1 further comprising said failing node writing its memory contents into a coredump storage device and updating a completion header to indicate that the coredump writing process has been completed.

8. A first node configured to serve data access requests for data on storage devices in a storage system cluster and being coupled to a second node, the second node configured to takeover serving data access requests of the first node upon a failure of the first node, and said first and second node being coupled by a cluster interconnect, the first node comprising:
    (a) a coredump process running on said first node, said coredump process configured to detect a failure and upon detecting a failure, said first node being further configured to select a coredump storage device to which said first node writes contents of its memory;
    (b) a data structure containing ownership information regarding each storage device associated with the first node, said ownership information including at least one of a world wide name identifying the storage device on a fiber channel network, and unique storage device identification information;
    (c) a cluster interconnect driver configured to send messages across the cluster interconnect to the second node, including messages generated by the coredump process which message includes a world wide name of a coredump storage device to be used in accordance with the coredump process such that the second node places reservations on the storage devices of the first node excluding the coredump storage device and continues with takeover of the storage devices excluding the coredump storage device and (d) said coredump process setting a flag in a coredump header indicating completion of the coredump writing process, after which the second node is adapted to place a reservation on the coredump storage device.

9. The first node as defined in claim 8 wherein said coredump process of said first node is further configured to write a completion header on said coredump storage device when said first node has completed writing its memory contents to said coredump storage device.

10. A storage system node, that is configured to serve data access requests for data on storage devices in a storage system cluster of a second node upon a failure of the second node, and said storage system node and second node being coupled by a cluster interconnect, the storage system node comprising:
- (a) a takeover monitor process configured to commence a takeover process during which the storage system node receives a message from the second node, that includes a data structure identifying a coredump storage device and in response to receiving such a message, extracting unique storage device identification information from a data structure in the message;
- (b) a storage device driver system communicating with said takeover monitor process, and said storage device driver system configured to, upon receipt of said unique storage device identification information of a coredump storage device from the data structure in the message, place reservations on storage devices of the second node excluding the coredump storage devices; and
- (c) said takeover monitor process further including a timer that is set upon receipt of said message and upon expiry of said timer, said takeover monitor process is further configured to read labels on said coredump storage device and, if a completion header is present, to place a reservation on said coredump storage device and to copy the coredump information stored therein to a memory on the node.

11. A computer-readable storage medium in a storage system that includes a first node that is a failing node, and a second node that is a takeover node, said nodes coupled by a cluster interconnect, the computer readable medium comprising:
- (a) program instructions for detecting a failure in a failing node and initiating a coredump procedure running on a storage operating system of the failing node;
- (b) program instructions for identifying a coredump storage device that can receive a coredump of memory contents of the failing node;
- (c) program instructions for obtaining unique storage device identification information for the coredump storage device;
- (d) program instructions for generating a message that includes said unique storage device identification information and sending the message across a cluster interconnect to a takeover node in the cluster;
- (e) program instructions for, upon receiving said message at said takeover node, obtaining said unique storage device identification information and asserting reservations on storage devices of the failing node excluding the coredump storage device identified by the unique storage device identification information and
- (f) program instructions for resetting at said failing node storage adapters simultaneously with said takeover node asserting said reservations on the storage devices excluding the coredump storage device.

12. The computer-readable storage medium as defined in claim 11 wherein said unique storage device identification information includes a world wide name.

13. The computer-readable storage medium as defined in claim 12 comprising program instructions for:
upon receiving said message, obtaining the world wide name of said coredump storage device;
translating said world wide name into unique storage device identification information; and
passing said unique storage device identification information to an associated storage device driver system which asserts reservations on storage devices other than the coredump storage device as identified.

14. The computer-readable storage medium as defined in claim 13 comprising program instructions for:
said failing node writing its memory contents into said coredump storage device; and
updating a completion header to indicate that said coredump writing procedure has been completed.

15. The computer-readable storage medium as defined in claim 11 comprising at said takeover node, program instructions such that, upon receiving said message, said takeover node setting a timer, the elapse of which triggers said takeover node to begin polling said coredump storage device for a completion header.

16. The computer-readable storage medium as defined in claim 15 comprising program instructions for:
said timer elapsing and said takeover node polling said coredump storage device for said completion header; and in response to finding said completion header, placing a reservation on said coredump storage device; and
copying the coredump information from said coredump storage device into core memory on the takeover node.

* * * * *

UNITED STATES PATENT AND TRADEMARK OFFICE
CERTIFICATE OF CORRECTION

PATENT NO. : 7,987,383 B1
APPLICATION NO. : 11/741546
DATED : July 26, 2011
INVENTOR(S) : Susan M. Coatney et al.

It is certified that error appears in the above-identified patent and that said Letters Patent is hereby corrected as shown below:

TITLE PAGE, ITEM (54) TITLE: SHOULD READ: "SYSTEM AND METHOD FOR RAPID ~~INDENTIFICATION~~ IDENTIFICATION OF COREDUMP DISKS DURING SIMULTANEOUS TAKE OVER"

Col. 12, line 1: "~~minoring~~mirroring and/or parity (RAID). The file system 360 illustra-"

Col. 12, line 5: "byte (kB) blocks and using index nodes ~~("modes")~~("inodes") to identify"

Col. 12, line 9-11: "metadata files include, among others, an ~~mode~~inode file. A file handle, i.e., an identifier that includes an ~~mode~~inode number, is used to retrieve an ~~mode~~inode from disk."

Col. 12, lines 12-22: "Broadly stated, all ~~modes~~inodes of the write-anywhere file system are organized into the ~~mode~~inode file. A file system (fs) info block specifies the layout of information in the file system and includes an ~~mode~~inode of a file that includes all other ~~modes~~inodes of the file system. Each logical volume (file system) has an fsinfo block that is preferably stored at a fixed location within, e.g., a RAID group. The ~~mode~~inode of the ~~mode~~inode file may directly reference (point to) data blocks of the ~~mode~~inode file or may reference indirect blocks of the ~~mode~~inode file that, in turn, reference data blocks of the ~~mode~~inode file. Within each data block of the ~~mode~~inode file are embedded ~~modes~~inodes, each of which may ref-"

Col. 12, line 35: "the ~~mode~~inode file using the ~~mode~~inode number to access an appropriate"

Signed and Sealed this
Thirteenth Day of September, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,987,383 B1 | Page 1 of 1 |
| APPLICATION NO. | : 11/741546 | |
| DATED | : July 26, 2011 | |
| INVENTOR(S) | : Susan M. Coatney et al. | |

It is certified that error appears in the above-identified patent and that said Letters Patent is hereby corrected as shown below:

TITLE PAGE, ITEM (54) and at Column 1, lines 1-3, TITLE: SHOULD READ: "SYSTEM AND METHOD FOR RAPID ~~INDENTIFICATION~~ IDENTIFICATION OF COREDUMP DISKS DURING SIMULTANEOUS TAKE OVER"

Col. 12, line 1 should read: "~~minoring~~mirroring and/or parity (RAID). The file system 360 illustra-"

Col. 12, line 5 should read: "byte (kB) blocks and using index nodes (~~"modes"~~)("inodes") to identify"

Col. 12, line 9-11 should read: "metadata files include, among others, an ~~mode~~inode file. A file handle, i.e., an identifier that includes an ~~mode~~inode number, is used to retrieve an ~~mode~~inode from disk."

Col. 12, lines 12-22 should read: "Broadly stated, all ~~modes~~inodes of the write-anywhere file system are organized into the ~~mode~~inode file. A file system (fs) info block specifies the layout of information in the file system and includes an ~~mode~~inode of a file that includes all other ~~modes~~inodes of the file system. Each logical volume (file system) has an fsinfo block that is preferably stored at a fixed location within, e.g., a RAID group. The ~~mode~~inode of the ~~mode~~inode file may directly reference (point to) data blocks of the ~~mode~~inode file or may reference indirect blocks of the ~~mode~~inode file that, in turn, reference data blocks of the ~~mode~~inode file. Within each data block of the ~~mode~~inode file are embedded ~~modes~~inodes, each of which may ref-"

Col. 12, line 35 should read: "the ~~mode~~inode file using the ~~mode~~inode number to access an appropriate"

This certificate supersedes the Certificate of Correction issued September 13, 2011.

Signed and Sealed this
Eleventh Day of October, 2011

David J. Kappos
*Director of the United States Patent and Trademark Office*